United States Patent [19]

Lewis

[11] Patent Number: 4,796,192
[45] Date of Patent: Jan. 3, 1989

[54] MANEUVER LOAD ALLEVIATION SYSTEM

[75] Inventor: George E. Lewis, Renton, Wash.

[73] Assignee: The Boeing Company, Seattle, Wash.

[21] Appl. No.: 781,656

[22] Filed: Nov. 4, 1985

[51] Int. Cl.$^4$ .............................................. B64C 9/10
[52] U.S. Cl. .................................. 364/463; 244/75 R; 244/90 R
[58] Field of Search ................................ 364/434, 463; 244/75 R175 A, 76 R, 76 C, 191, 195, 90 R

[56] References Cited

U.S. PATENT DOCUMENTS

| | | | |
|---|---|---|---|
| 2,448,712 | 9/1948 | Hampshire | 244/203 |
| 3,131,890 | 5/1964 | Wirz | 244/75 R |
| 3,347,498 | 10/1967 | Priestley et al. | 244/191 |
| 3,734,432 | 5/1973 | Low | 244/75 R |
| 3,940,094 | 2/1976 | Kress et al. | 244/182 |
| 4,146,200 | 3/1979 | Borzachillo | 244/75 R |
| 4,150,803 | 4/1979 | Fernandez | 244/226 |
| 4,455,004 | 6/1984 | Whitaker, Sr. | 244/90 R |
| 4,472,780 | 9/1984 | Chenoweth et al. | 364/434 |
| 4,479,620 | 10/1984 | Rogers et al. | 244/75 R |

FOREIGN PATENT DOCUMENTS 1074677  7/1967  United Kingdom ............... 364/463

Primary Examiner—Errol A. Krass
Assistant Examiner—V. N. Trans
Attorney, Agent, or Firm—Seed and Berry

[57] ABSTRACT

A system for reducing wing root bending moment load during aircraft maneuvers. The system operates to reduce the lift on the outboard section of the wing by moving an outboard flap upward in response to commands calculated from aircraft parameters and a predetermined wing root bending moment load limit.

10 Claims, 6 Drawing Sheets

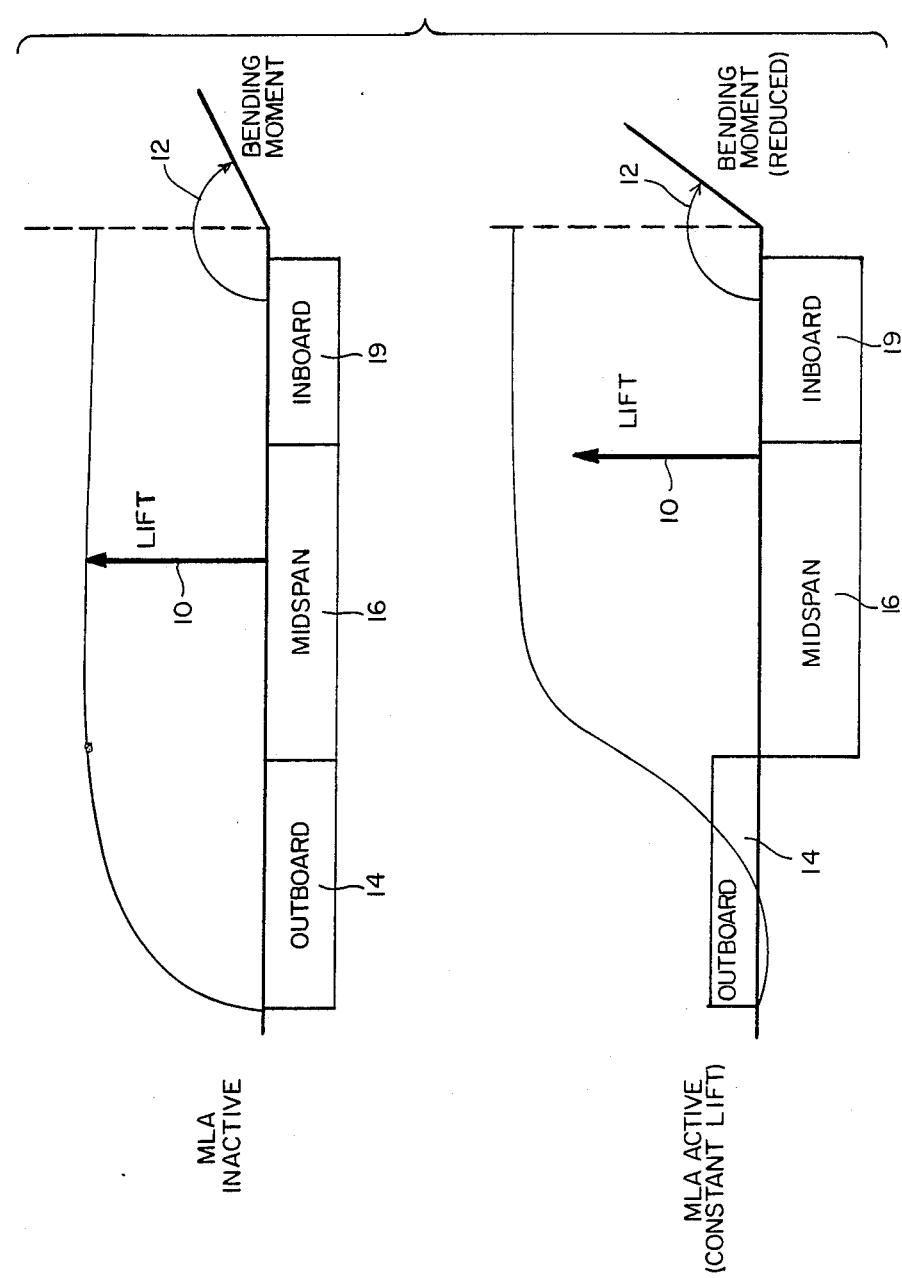

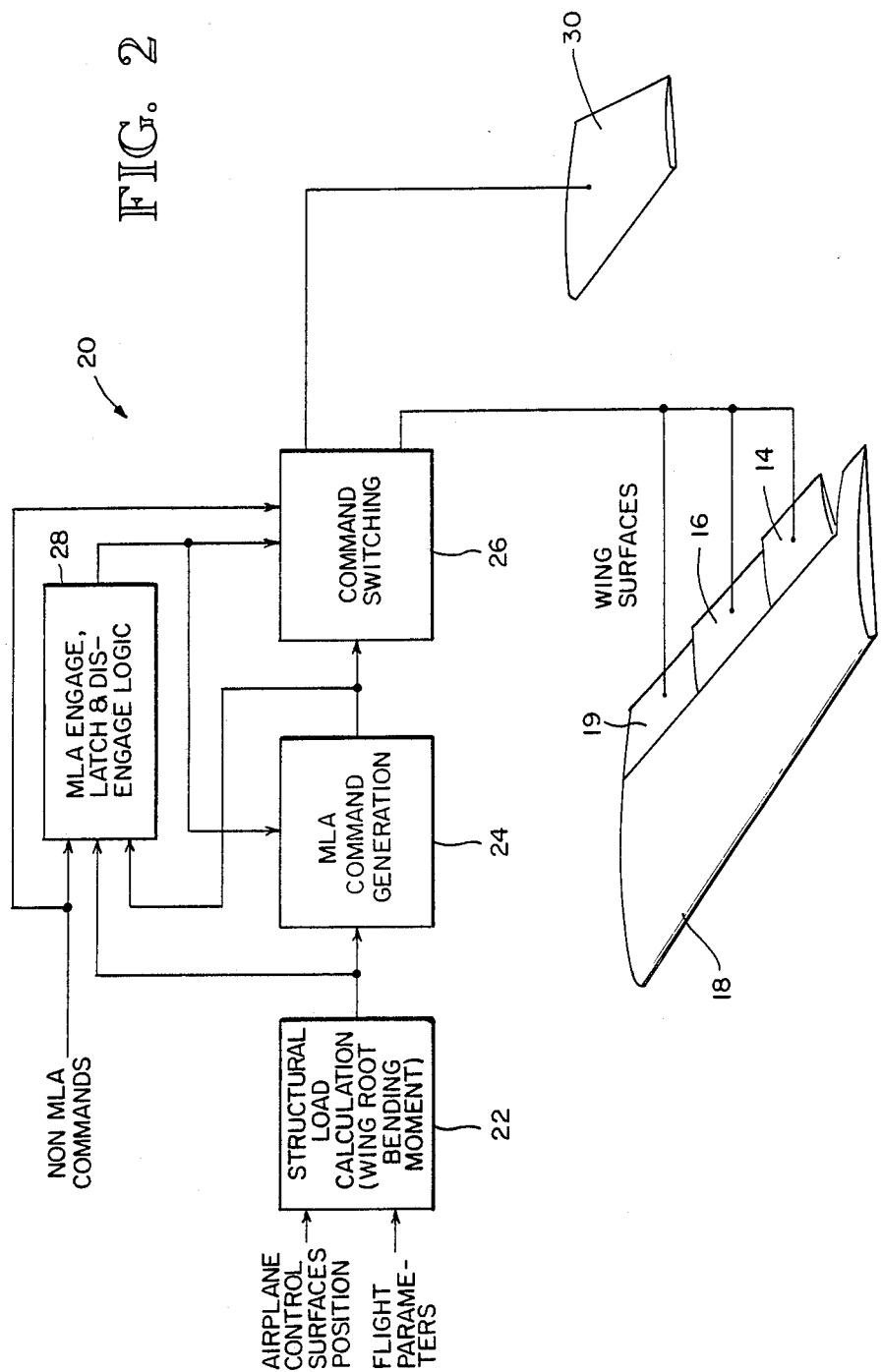

MANEUVER LOAD ALLEVIATION SYSTEM

BACKGROUND OF THE INVENTION

This invention relates to a system for reducing the wing root bending load on an aircraft and more particularly, but not by way of limitation, to reducing the wing root bending load automatically when a threshold load level is exceeded during high speed maneuvers or other critical maneuvers.

Airplane wing structures are usually either maneuver-load or gust-load critical depending on whether the aircraft is a high performance-high maneuver aircraft or a transport type of aircraft. Although design objectives differ for these two different types of aircraft, the underlying principle of redistribution of airload to reduce wing structural loads and structural weights is the same. While the system described herein is for a maneuver critical wing, the same principle and control systems are applicable for a gust-critical wing.

Heretofore, various existing aircraft have wing-load-alleviation systems. Typical of these systems are those used with 747 and L-1011 aircraft and that are designed primarily for gust-alleviation with the benefits of improved ride comfort and extended structural fatigue life. The systems on these aircraft operate full time with commands to the wing surfaces being generated at all levels of disturbance. However, the system described in this application is unique in that it has a threshold level for commanding wing surfaces and is also potentially capable of commanding different wing surfaces on the aircraft based on the authority required to achieve the necessary level of load alleviation.

In the following United States Patents: U.S. Pat. Nos. 2,448,712 to Hampshire, 2,816,724 to Snodgrass, 3,790,106 to Sweeney et al, 3,814,912 to Manke et al, 3,940,094 to Kress et al, 4,027,839 to Quinlivan, 4,382,282 to Graham et al, various types of wing sweep control systems, high angle of attack systems, wing flap and trim control systems are shown. None of these prior art patents provide the unique features and advantages of the subject manuever load alleviation system.

SUMMARY OF THE INVENTION

A manuevering aircraft has a widely and rapidly varying wing root bending moment load in response to pilot command inputs and aircraft flight conditions, such as velocity, altitude and maneuver "g" level. Since the aircraft and its flight systems for control of a maneuver is a dynamic system wherein overshoot of load may occur in response to commands, the maneuver load alleviation system must begin to command the outboard trailing edge flap wing root bending moment load below the wing root bending moment limit load in order to prevent exceeding the wing root bending moment limit load. The wing root bending moment level when commands to the outboard wing trailing edge are initiated is referred to herein as the threshold wing root bending moment level. The threshold level which is used herein is 95 percent of the wing root bending moment limit load to allow for dynamic response of the maneuver load alleviation system and other aircraft flight systems.

The subject maneuver load alleviation system has no effect on the control surfaces or the operation of the aircraft when the wing root bending moment is below the threshold. However, above the threshold the system commands the trailing edge surface or outboard flap wing to maintain the root bending moment below the threshold value.

In this system the midspan and inboard trailing edge flaps of the wing are free to respond to the aircraft control commands. Furthermore, the outboard trailing edge flap is free to respond to normal flight system commands below the threshold level. Also, the system has independent right and left wing systems for asymmetric flight conditions.

The maneuver load alleviation system also inputs commands into the normal aircrafts flight systems to minimize undersirable airplane responses due to wing flap commands originating from the manuever load alleviation system.

An aircraft using the subject system will have a higher maneuver limit i.e. "g" level than an aircraft with the same structural weight, but without this system. Conversely, an aircraft using this system will have less structural weight than an aircraft without this system where both aircraft are designed for the same limit i.e. "g" level. Also, the aircraft fatigue life can be increased by using the subject system.

The reduction in structural weight is provided from a reduced level of bending moment at the wing root. This is because the bending movement is the principle determinator of structural strength requirements and thus weight of the aircraft wing. This system is particularly beneficial for reducing structural weight resulting from a few critical design points in the flight envelope where the highest wing root bending moment loads occur.

The system includes means for computing an estimated wing root bending moment using normal acceleration, weight, dynamic pressure, mach number, roll rate and acceleration, and leading and trailing edge surface positions along with stabilon deflection. The estimated computed bending moment is compared to a quantity equal to 95 percent of the bending moment limit load. If this threshold is exceeded the outboard flap is commanded a command signal upward thereby shifting the wing air load inboard towards the wing root, thereby reducing the wing root bending moment load. The maneuver load alleviation command to the outboard flap has priority over all other commands to the outboard flap.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 comprising FIGS. 1A and 1B, illustrates the principle of redistribution of airload and its effect on a wing structural design.

FIG. 2 illustrates a diagram of the maneuver load alleviation system.

DETAILED DESCRIPTION OF THE DRAWINGS

Figure 3A:
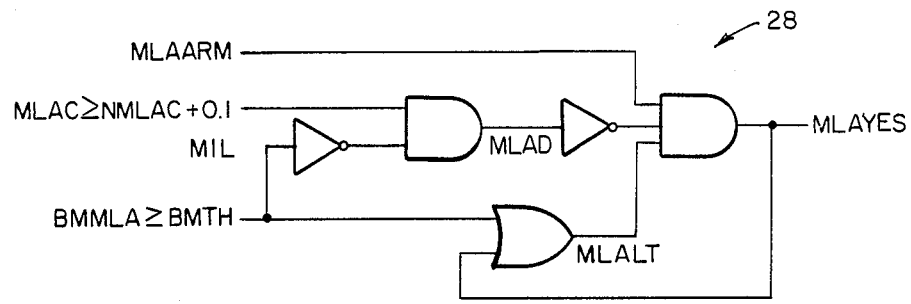
FIG. 3A illustrates the maneuver load alleviation system logic diagram.

In FIG. 1 the principle of redistribution of airload to move the lift center of pressure inboard and the effect on wing root structural bending moment is shown. In this illustration for a same total lift illustrated by vertical arrow 10 a wing root bending moment indicated by arrow 12 is reduced as shown in the lower drawing when a control surface or outboard flap 14 and potentially a second control surface midspan flap 16 depending on flight conditions and design is deflected upward to reduce the airload on the outboard part of a wing. From reviewing the lower diagram with the upper diagram in FIG. 1 the same total lift is provided when the outboard flap 14 is deflected in an upward position along with a higher angle of attack for the aircraft. A left wing 18 is shown in FIG. 2 with the outboard flap 14 in an up position and the midspan flap 16 moved slightly upward. An inboard flap 19 remains in an undeflected position.

Referring now to FIG. 2 a diagram of the maneuver load alleviation system is shown and designated by general reference numeral 20. In this illustration the system 20 is designed for a left wing 18. The system 20 for a right wing is identical except for the computation of the right wing's root structural load or bending moment. The separate systems for right and left wings allow for non-symmetric flight conditions, the difference being roll rate and acceleration effects on wing structural loads and differing wing surface displacements due to roll commands where wing trailing edge surfaces are used for roll control.

The major elements of the system 20 as shown include wing root bending moment or structural load calculation 22, maneuver load alleviation command generation 24, command switching 26, and system engage, latch and disengage logic 28. For clarity in reading the specifications and figures, maneuver load alleviation is abbreviated MLA or Non-MLA.

The wing 18 shown in FIG. 2 has three trailing edge surfaces, 14, 16 and 19. For the system 20 described in this disclosure, only the outboard wing flap 14 is commanded as it has been found that this surface 14 is most effective in providing structural load relief at the wing root through air load redistribution. However, when the effectiveness of this surface 14 is no longer sufficient to provide the necessary structural load reduction due to either being surface rate limited or the outboard flap 14 reaching its deflection limits, the system 20 can be extended to automatically transfer the MLA command from command switching to the midspan flap 16. The process of transferring system commands to different surfaces can be continued until all surfaces are used to effect structural load reduction. Generally, the inboard wing flap 19 is not used as this surface is ineffective in reducing wing structural loads. Also, the system 20 may be used to crossfeed the commands to a stabilon 30. The commands would be added to the normal stabilon commands or Non-MLA commands.

The source of commands for the wing flaps 14 and 16 is determined by the system's engage, latch, and disengage logic 28. This logic 28 is detailed in FIG. 3A. The purpose of the logic is to provide a smooth transition of MLA system commands to the wing surfaces when the wing structural load exceeds a threshold with a smooth transition back to non-MLA system wing surface commands when the structural loads return to a level below the threshold. The threshold may be 95 percent of the root bending moment or any other acceptable threshold level for wing lift control.

Figure 3B:
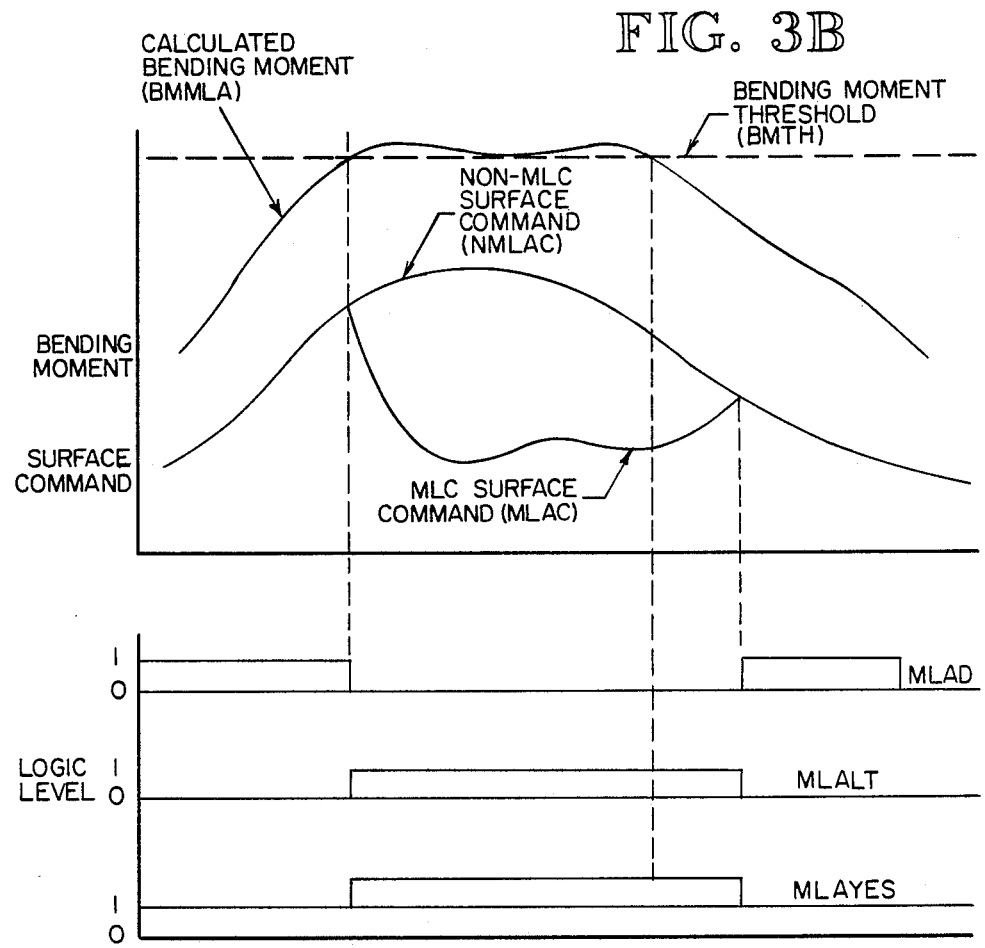
FIG. 3B illustrates the systems logic operation.

In FIG. 3A the logic 28 causes a logic output identified by MLAYES to change from a 0 to a 1 when the aircraft pilot has enabled the system 20 (MLAARM=1) and the system's bending moment (BMMLA) exceeds a threshold value (BMTH). The system 20 engagement (MLAYES) also causes the system to latch (MLALT=1). The system remains in the latched state until the MLA generated command to the wing surface identified by MLAC returns to a Non-MLA wing surface common value (NMLAC). A small bias is added to the Non-MLA wing surface command (NMLAC) before the comparison is made to prevent excess activity of the system 20 when both the bending moment is in the neighborhood of the threshold level and the MLA and the Non-MLA commands are close. For the logic 28 as shown positive commands are for the wing surface trailing edge down and the MLA causing the trailing edge or flap 14 with an up surface command. The operation of this system 28 relative to the calculated bending moment (BMMLA) and threshold bending moment level (BMTH) and Non-MLA commands is shown in FIG. 3B.

Figure 4:
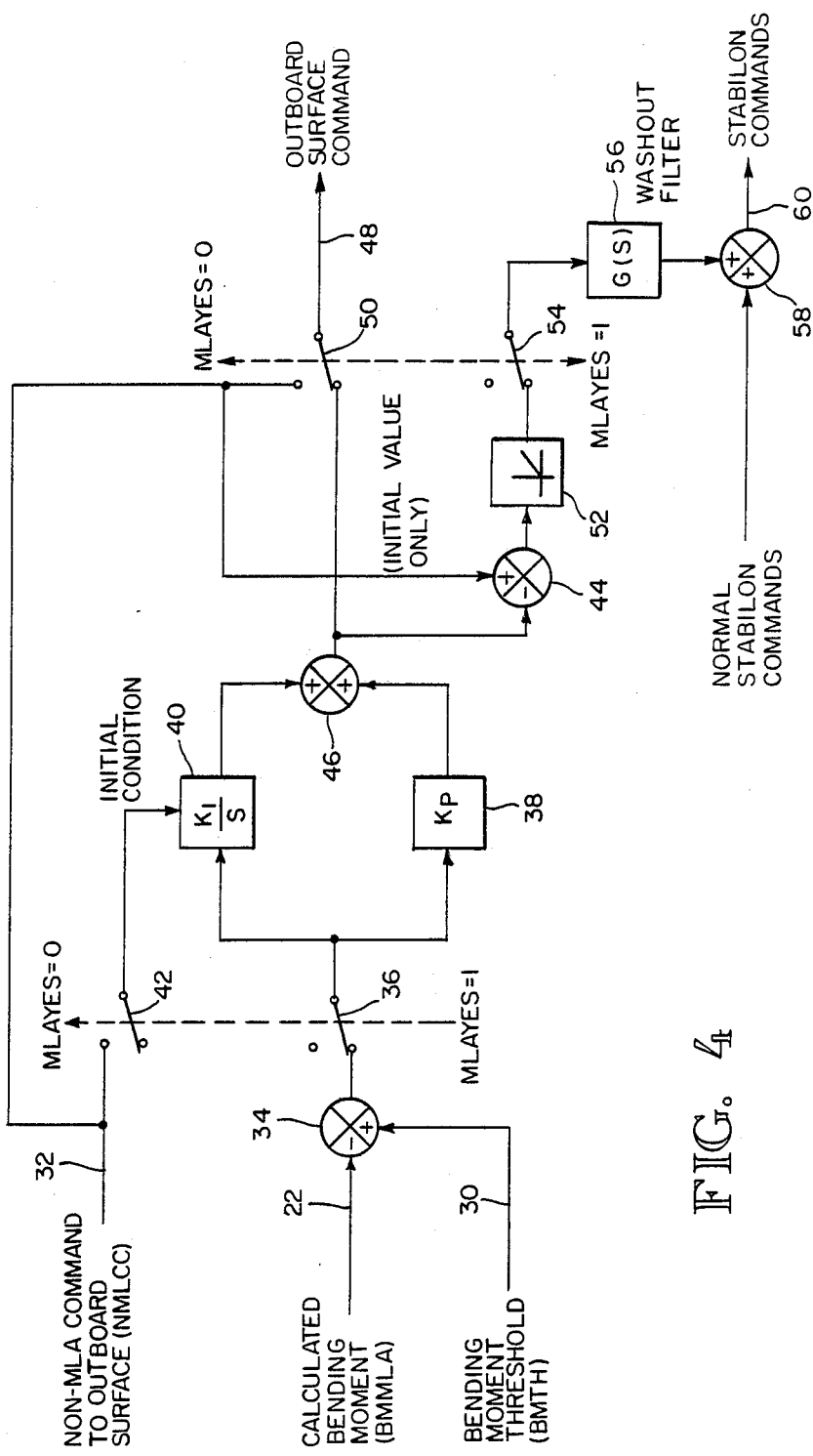
FIG. 4 illustrates the systems command generation and switching diagram.

In FIG. 4 the MLA system command generation 24 and command switching 26 diagram are shown. In this embodiment command generation 24 includes four inputs. That is calculated bending moment 22 (BMMLA), threshold bending moment 30 (BMTH), Non-MLA wing surface commands 32 (NMLCC), and MLA logic state MLAYES. Initially, when the calculated wing structural load 22 is less than the threshold 30 the output of a comparator 34 is prevented by a switch 36 from being input into a parallel proportional integrator 38 with gain Kp and to an integral gain signal integrator 40 with gain K1. When the calculated wing root bending moment 22 increases and exceeds the threshold level 30 the logic level of MLAYES changes from 0 to 1 causing switch 36 to close and switch 42 to open simultaneously, both the integrator 40 and crossfeed to a stabilon summer 44 are initialized to the Non-MLA wing surface command value. This initialization provides a smooth transition from Non-MLA to MLA surface commands.

The proportional signal output 38 and integral signal output 40 are summed at a summer 46 to form the MLA outboard flap 14 surface command indicated by arrow 48. The output of the command 48 commands the wing outboard flap 14 when switch 50 is closed (MLAYES=1). The MLA command is also input to the stabilon 30 through summer 44. At the time when the MLA system 20 is activated and MLAYES changes from 0 to 1 the one side of the summer 44 is initialized with the Non-MLA surface command from summer 46 to prevent transients. The summer output 44 is input to a limiter 52 to block negative commands before entering switch 54 and washout filter 56 G(S). The purpose of the washout filter 56 is to prevent feedforward of MLA system commands to the stabilon 30 in a steady state condition. After the filter 56 system-generated stabilon commands are added to the normal stabilon commands at a summer 58 for combined stabilon commands indicated by arrow 60.

Figure 5:
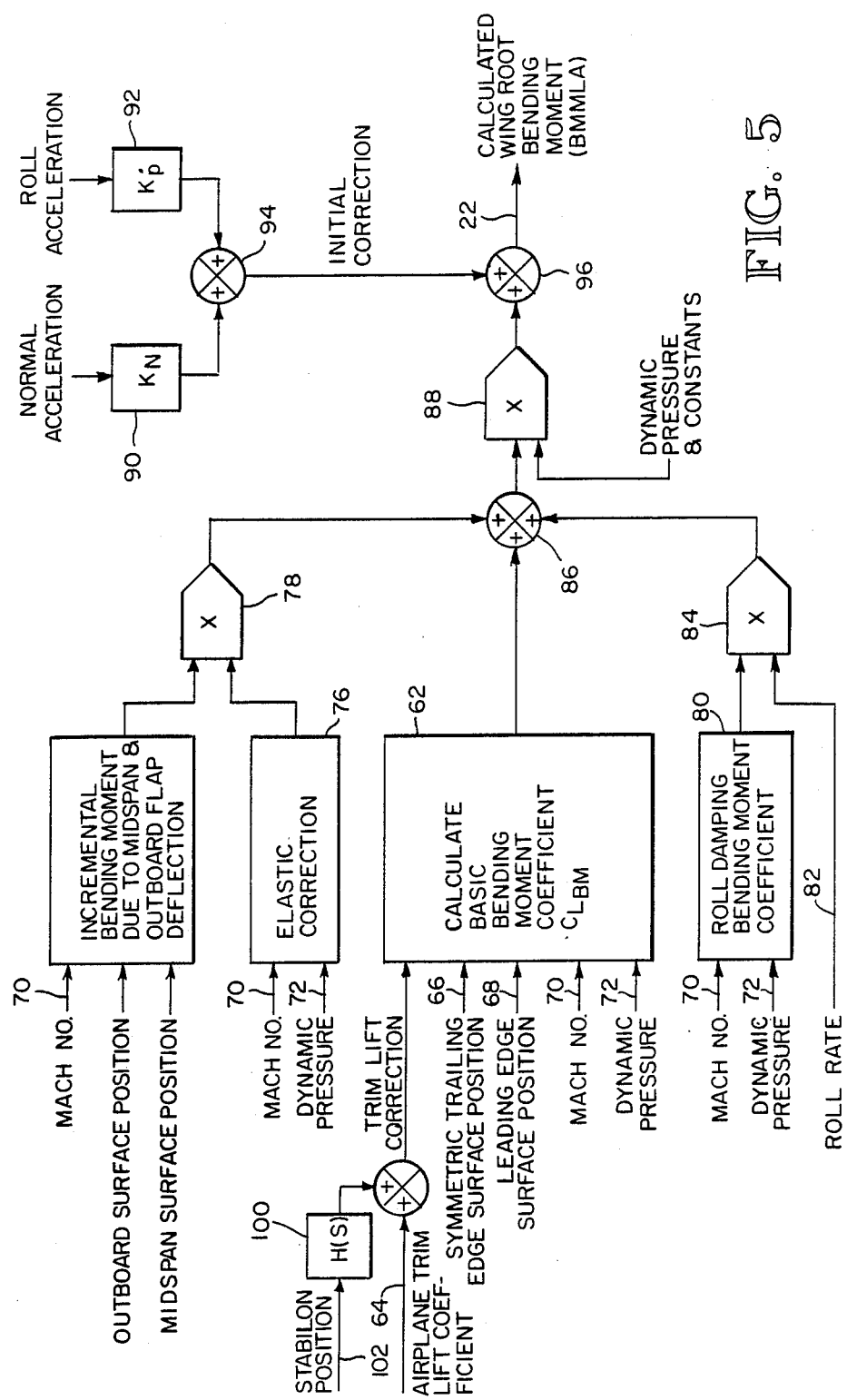
FIG. 5 illustrates a diagram for calculating wing root bending moment load of one wing.

The MLA bending moment 22 as shown in FIG. 4 is calculated from airplane configuration and flight parameters as shown in FIG. 5. The procedure starts by calculating a basic bending moment coefficient (CLBM) 62 based on airplane trim lift 64, symmetric trailing edge surface position 66, leading edge surface position 68, mach number 70, and dynamic pressure 72. Corrections are now made using incremental bending moment due to flap deflection at 74 multipled by elastic correction 76 and collected at 86 along with roll damping bending moment coefficient 80 multiplied 84 by roll rate 82. The collected result 86 is multiplied by the dynamic pressure 72 and constants to give a preliminary bending moment at 88. Input of airplane trim lift 64 is provided from calculated trim lift 57 based on weight 59, dynamic pressure 72 and normal acceleration 91.

Corrections are now made to include the effects of inertia with terms due to both normal acceleration with coefficient $K_N$ 90 and roll acceleration with coefficient $K_P$ 92. The inertial components are summed at 94 and then summed 96 with the results of the preliminary bending moment 88 to give calculated wing bending moment 22. Because the data used in the bending moment calculation are based on a trimmed airplane, a correction is made for out of trim stabilon commands which occur during a maneuver. The correction is made by adding at summer 98 a filtered output H(S) of stabilon position 102. A filter 100 comprises a washout filter characteristic to provide the proper correction to trim lift coefficient.

Figure 6A:
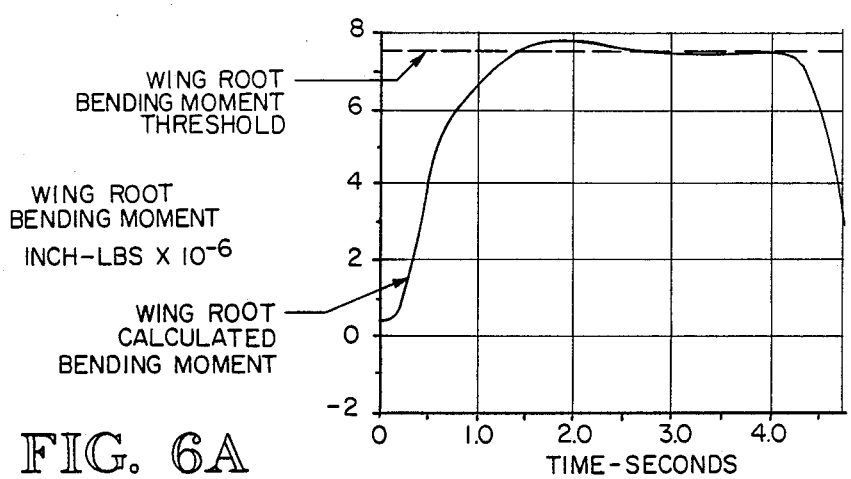
FIGS. 6A, 6B, and 6C illustrate graphs of wing root bending moment, wing surface position, and center of gravity acceleration for typical system operation during an aircraft maneuver.
Figure 6B:
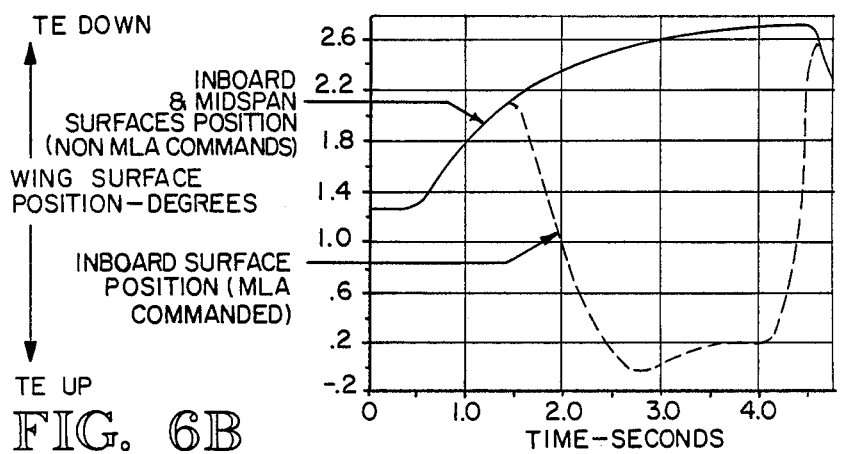
Figure 6C:
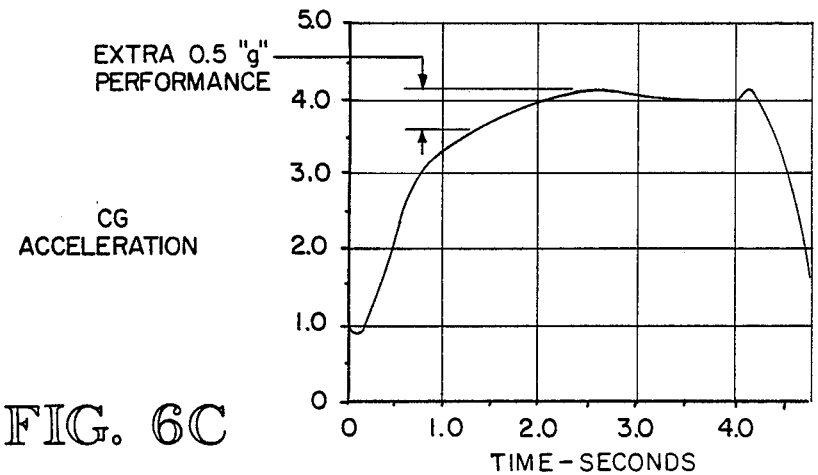

The operation of the maneuver alleviation system 20 is shown in FIGS. 6A, 6B and 6C. The airplane responds to a stick ramp command that limits at 0.5 seconds and then reverses at 4.0 seconds to return the airplane to a steady 1.0 condition. As shown in FIG. 6A the system 20 is activated at 1.4 seconds when the wing root calculated bending moment exceeds the threshold value. The outboard wing surface now deflects upward as shown in FIG. 6B thereby shifting the wing airload and preventing the wing root bending moment from exceeding the threshold value except by a small margin for overshoot even though the airplane "c.g." acceleration level is still increasing as indicated in FIG. 6C. As shown in FIG. 6C the system 20 enables the aircraft pilot to increase the maximum maneuver "g" level by 0.5 "g" without increasing the wing root bending moment above a threshold design level. An allowance is made in the setting of the threshold for overshoot to prevent exceeding the wing limit load. At the conclusion of the maneuver the pilot's stick reversal at 4.0 seconds, the outboard surface returns to the Non-MLA commanded position after the wing root bending moment decreases to a level below the threshold.

Changes may be made in the construction and arrangement of the parts or elements of the embodiments as described herein without departing from the spirit or scope of the invention defined in the following claims:

What is claimed is:

1. A maneuver load alleviation system for shifting the wing airload inboard towards the wing root of an aircraft during a maneuver, the system comprising:
   means receiving input data for computing the wing root bending moment load of each wing of the aircraft during the maneuver on the basis of a plurality of parameters, including the roll rate or acceleration of the aircraft;
   means coupled to the means for computing for comparing the computed wing root bending moment load of each wing with a threshold level of the wing root bending moment; and
   means coupled to the means for comparing for providing left and right wing command signals, to respective outboard flaps on the left and right wings for moving the flaps upward responsive to the calculated wing root bending moment load for the respective wing exceeding the threshold level, thereby reducing the wing root bending moment for each wing below the threshold level.

2. The system as described in claim 1 wherein the means for computing the wing root bending moment load is calculated from the airplane's configuration and flight parameters such as airplane normal acceleration, weight, trailing edge surface positions, leading edge surface positions, stabilon position, mach number, dynamic pressure and roll acceleration and rate.

3. A maneuver load alleviation system for shifting the wing airload inboard towards the wing root of an aircraft during a maneuver, the system comprising:
   means receiving input data for computing the wing root bending moment load of the aircraft during the maneuver;
   means coupled to the means for computing for comparing the computed wing root bending moment load with a threshold level of the wing root bending moment;
   means coupled to the means for comparing for providing a command signal, should the calculated structural load exceed the threshold level, to an outboard flap on the wing for moving the flap upward, thereby reducing the wing root bending moment below the threshold level; and
   means for providing a second command signal to a midspan flap for moving the midspan flap upward, thereby reducing the wing root bending moment below the threshold level should the calculated wing root bending moment load still exceed the threshold level when operating the outboard flap to the full up position.

4. A maneuver load alleviation system for shifting the wing airload inboard towards the wing root of an aircraft during a maneuver, the system comprising:
   means receiving input data for computing the wing root bending moment load of the aircraft during the maneuver;
   means coupled to the means for computing for comparing the computed wing root bending moment load with a threshold level of the wing root bending moment, said means for comparing including logic means for engaging, latching and disengaging the means for providing a command signal when the threshold level is exceeded; and
   means coupled to the means for comparing for providing a command signal, should the calculated structural load exceed the threshold level, to an outboard flap on the wing for moving the flap upward, thereby reducing the wing root bending moment below the threshold level.

5. A maneuver load alleviation system for shifting the wing airload inboard towards the wing root of an aircraft during a maneuver, the system comprising:
   means receiving input data for computing the wing root bending moment load of the aircraft during the maneuver;
   means coupled to the means for computing for comparing the computed wing root bending moment load with a threshold level of the wing root bending moment;
   means coupled to the means for comparing for providing a command signal, should the calculated structural load exceed the threshold level, to an outboard flap on the wing for moving the flap upward, thereby reducing the wing root bending moment below the threshold level; and means for providing a crossfeed signal to a stabilon of the aircraft for minimizing the effects of outboard flap deflection on aircraft response characteristics when the threshold level is exceeded.

6. A maneuver load alleviation system for shifting the wing airload inboard towards the wing root of an aircraft during a maneuver, the system comprising:

means for computing the wing root bending moment load of the aircraft during the maneuver, the calculation based on flight parameters and position of aircraft control surfaces;

engage, latch and disengage logic connected to the means for computing, the logic comparing the calculated load with a threshold level of the wing root bending moment of a maximum acceptable value; and command generation and switching means connected to the logic and means for computing, the switching means turning on when the threshold is exceeded and a command signal is generated for moving an outboard flap upward, the switching means turning off when the calculated bending moment falls below the threshold.

7. A method for reducing a wing structural load on an aircraft by shifting the wing airload inward toward the wing root, the steps including:

computing a calculated wing root bending moment load of each wing of the aircraft during a maneuver on the basis of a plurality of parameters, including the roll rate or acceleration of the aircraft;

comparing the calculated wing root bending moment load of each wing with a threshold level of a maximum acceptable bending moment value of the wing; and providing left and right wing command signals to respective outboard flaps on the left and right wings and moving the flaps upward responsive to the calculated wing root bending moment for the respective wing exceeding the threshold level, thereby shifting the respective wing airload inward.

8. The method as described in claim 7 further including a step of stopping the command signal the outboard flap when the calculated structural load falls below the threshold level.

9. A method for reducing a wing structural load on an aircraft by shifting the wing airload inward toward the wing root, the steps including:

computing a calculated wing root bending moment load of the aircraft during a maneuver;

comparing the calculated structural load with a threshold level of a maximum acceptable bending moment value of the wing;

providing a command signal should the structural load calculation exceed the threshold level to an outboard flap on the wing and moving the flap upward, thereby shifting the wing airload inward; and providing an additional crossfeed signal to the aircraft's stabilon for increased control when the threshold is exceeded.

10. A method for reducing a wing structural load on an aircraft by shifting the wing airload inward toward the wing root, the steps including:

computing a calculated wing root bending moment load of the aircraft during a maneuver;

comparing the calculated structural load with a threshold level of a maximum acceptable bending moment value of the wing;

providing a command signal should the structural load calculation exceed the threshold level to an outboard flap on the wing and moving the flap upward, thereby shifting the wing airload inward; and providing a second command signal to a midspan flap should the calculated wing bending moment load still exceed the threshold level after the outboard flap has been moved to the full up position, thereby further shifting the wing airload inward toward the wing root.

* * * * *